Sept. 3, 1929.  J. F. DE TÓVÁROS  1,727,274
SLIDING CURRENT COLLECTOR FOR ELECTRIC VEHICLES
Filed June 27, 1927
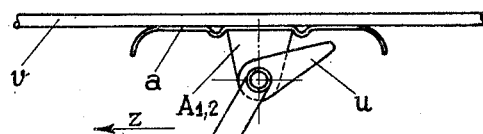
Fig.1.
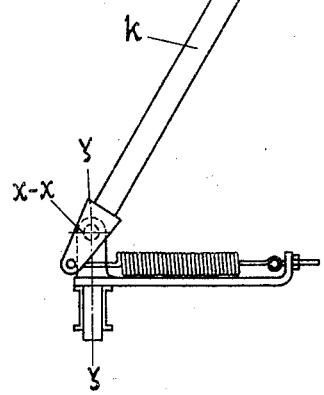
Fig.2.
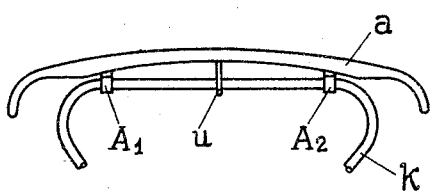
Fig.3.
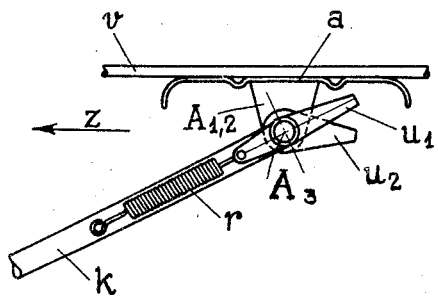
Inventor:
J. F. de Tóváros
By Emil Bönnelycke
Attorney Patented Sept. 3, 1929.

1,727,274

UNITED STATES PATENT OFFICE.

JULIUS FISCHER DE TÓVÁROS, OF BUDAPEST, HUNGARY.

SLIDING CURRENT COLLECTOR FOR ELECTRIC VEHICLES.

Application filed June 27, 1927. Serial No. 201,887.

The heretofore known pivotally mounted current collectors with flat contact surfaces were provided with a counterweight in order to return the flat contact piece, after its tilting, into its normal position and to prevent the entire turning over of the same. On non-tilting trolley frames the counterweight may be replaced by a rabbet, as the collector plate travels always in the same direction. By eliminating the counterweight, the contact piece and the movable parts of the collector may be made lighter, so that owing to their reduced moment of inertia, they will follow more quickly in the vertical direction the varying position of the trolley wire.

My invention involves certain improvements over the prior forms, as hereinafter described; one embodiment of the new construction being shown in Fig. 1 in side elevation and in Fig. 2 in end view in the accompanying drawing, while Fig. 3 is a side view of a modification.

The single one-piece plate or shoe $a$ of which the collector consists is pivotally mounted at the points $A_1$ and $A_2$. The frame —$k$— can follow only the variations of the height of the trolley wire $v$ by turning on the horizontal axis $x$—$x$, while the collector plate —$a$— follows the varying directions of the trolley wire in the vertical plane by tilting round the axis $A_1$—$A_2$ parallel to the axis $x$—$x$.

The setting of the collector frame in the travelling direction is performed by turning it through 180° on the axis $Y$—$Y$ and fixing it in the new position.

The friction between the collector plate —$a$— and the trolley wire $v$ tends to tilt the plate in a direction opposite to the travelling direction —$z$—. This tilting is however not possible as long as the resultant of the friction force and of the force pressing the plate towards the trolley wire can pass through the axis; as soon as this becomes impossible, the collector plate, on tilting backward, is prevented from turning all the way back by a stop —$u$— mounted rigidly on the frame —$k$—.

If the collector plate is drawn down from the trolley wire, its total forward tilting is prevented by the frame —$k$—.

In the modification shown in Fig. 3, the stop —$u_1$— is pivotally mounted at $A_3$ on the frame —$k$— and supported by a spring —$r$—. The path of the movable stop —$u_1$— is limited by the stationary stop —$u_2$—. The stop —$u_1$— can be placed near the collector plate —$a$— and allows the plate to move or adjust itself so long as the stationary stop —$u_2$— does not prevent it. The spring pressed stop —$u_1$— helps to return the collector plate to its balanced position if—owing to excessive oscillation—it leaves the trolley wire, and such stops may be arranged on both sides of the frame.

I claim as my invention:

1. A current collector for trolleys, comprising a bow-shaped frame embodying a horizontal top member which is disposed transversely of the trolley wire, a metal collector plate pivoted to said horizontal member for vertical tilting movement forwards or backwards with respect to the direction of travel, and a stop rigidly fixed to the said horizontal member and projecting rearward therefrom to limit the backward tilting movement of the plate; said frame forming an acute angle with the trolley wire in the direction of travel, so that the frame itself is caused to act as a stop to limit the forward tilting movement of the plate.

2. A current collector for trolleys, comprising a bow-shaped frame embodying a horizontal top member which is disposed transversely of the trolley wire, a metal collector plate or shoe pivoted to said horizontal member for vertical tilting movement forwards or backwards with respect to the direction of travel, a stop rigidly fixed to the horizontal member and projecting rearward therefrom to limit the backward tilting movement of the plate, a stop pivoted to said member to be engaged and depressed by the plate during such backward tilting movement, and a spring connected to the pivoted stop to return the same and the plate.

In testimony whereof I affix my signature.

JULIUS FISCHER DE TÓVÁROS.